(12) United States Patent
Lanktree

(10) Patent No.: US 7,695,282 B2
(45) Date of Patent: Apr. 13, 2010

(54) DRIVER SAFETY PROGRAM

(75) Inventor: Daniel P. Lanktree, Boonton Township, NJ (US)

(73) Assignee: Gold Cross Safety Corp., Boonton Township, NJ (US)

( * ) Notice: Subject to any disclaimer, the term of this patent is extended or adjusted under 35 U.S.C. 154(b) by 896 days.

(21) Appl. No.: 11/221,027

(22) Filed: Sep. 6, 2005

(65) Prior Publication Data

US 2006/0078853 A1    Apr. 13, 2006

Related U.S. Application Data

(60) Provisional application No. 60/607,021, filed on Sep. 3, 2004.

(51) Int. Cl.
G09B 9/04    (2006.01)
(52) U.S. Cl. .............................. 434/65; 434/66; 434/236
(58) Field of Classification Search ............. 434/65–66, 434/236
See application file for complete search history.

(56) References Cited

U.S. PATENT DOCUMENTS

| | | | |
|---|---|---|---|
| 2,715,783 A * | 8/1955 | Conkling et al. | 434/65 |
| 3,885,324 A * | 5/1975 | Davenport et al. | 434/66 |
| 5,546,305 A | 8/1996 | Kondo | |
| 5,551,880 A * | 9/1996 | Bonnstetter et al. | 434/236 |
| 5,717,606 A | 2/1998 | Hara et al. | |
| 6,227,862 B1 * | 5/2001 | Harkness | 434/65 |
| 6,388,579 B1 | 5/2002 | Adcox et al. | |
| 6,392,564 B1 * | 5/2002 | Mackey et al. | 340/937 |
| 6,449,572 B1 | 9/2002 | Kurz et al. | |
| 6,618,504 B1 | 9/2003 | Yoshino | |
| 6,714,894 B1 | 3/2004 | Tobey et al. | |
| 7,265,663 B2 * | 9/2007 | Steele | 340/531 |
| 2001/0034011 A1 * | 10/2001 | Bouchard | 434/236 |
| 2002/0146667 A1 * | 10/2002 | Dowdell et al. | 434/62 |
| 2004/0158476 A1 * | 8/2004 | Blessinger et al. | 705/1 |

OTHER PUBLICATIONS

Inscape Publishing, Inc., D i S C Theory (2004).

* cited by examiner

*Primary Examiner*—Cameron Saadat
(74) *Attorney, Agent, or Firm*—Anatoly S. Weiser, Esq.

(57) ABSTRACT

In a driver training program, a manager conducts an observation drive with a program participant. During the observation drive, the manager observes the participant's driving without commenting on the driving. The manager discusses the observations with the participant during the conference, and provides reports to appropriate departments of the company, e.g., human resources, benefits, and fleet maintenance departments. Based on the manager's observations during the observation drive and other information regarding driving skills of the participant, a driver training curriculum is designed for the participant. The information regarding driving skills may include: the participant's driving record; actual driving information obtained by monitoring driving of the participant with a global positioning system and/or acceleration, braking, and cornering forces sensors; the participant's psychological profile; the participant's health-related information; and information regarding the participant's previous driver training. Future observation drive may be scheduled responsive to the information regarding the participant's driving skills.

20 Claims, 14 Drawing Sheets

Table of Contents

- Introduction
  - Letter to Employees
  - First Things First, A Valid Drivers License........1

- Vehicle Inspection and Use..................................................................Section 1
  - Exterior........2
  - Check Under the Vehicle........2
  - Condition of Vehicle........3
  - Secure Loose Items........3
  - Seat Belt Required........3

- Vehicle Operation.............................................................................Section 2
  - Maintaining Proper Following Distance........4
  - The Top 10 Driving Violations........5
  - Yield Means Yield, Stop Means Stop........5
  - Observing Highway Driving........5
  - Drive Defensively........6
  - Observing Drivers Scanning Techniques........6
  - Acceleration & Braking........6
  - Cooperative or Competitive........6
  - Parking Lots and Backing Up........6
  - Approaching Intersections........6

- Safety Attitude................................................................................Section 3
  - An Angry Driver........7
  - What To Do About Tailgaters........7
  - Distracted Driver........8
  - Cell Phones........8
  - Time Management........8

- "Company Information"....................................................................Section 4
  - Managers Driver Safety Observation........9
  - Driver Walk-Around Vehicle Inspection........10
  - Physical Vehicle Report........11
  - Corporate Fleet Safety Policy.....12 & 13
  - Corporate Fleet Safety Q&A....14
  - Corporate Fleet Safety Agreement.....15
  - Managers Documentation.....16
  - Employee Documentation......17
  - Managers *SMARTDRIVER* Challenge

*FIG. 1*

First Things First ●●●●●●●●●●●●●●●●●●●●●●●●●●●●

Does The Driver Have A Valid License?

Be absolutely sure the employee has a valid drivers license.

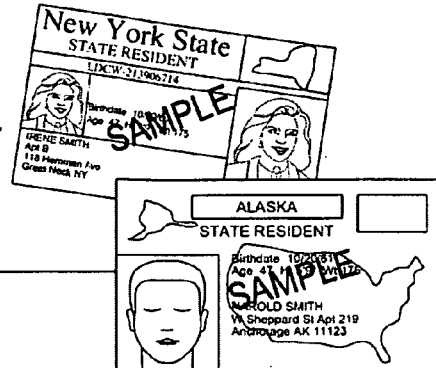

Inspect the license and check that the license shows;

- Current home address of the employee
- The expiration date
- The license is issued in the employee's current State of residence

An out-of-state license may indicate that the employee's in-state license has been revoked or suspended.

- Check that there are no restrictions* noted on the license that would limit the employees ability to fulfill their job requirements \* This does not apply to restrictions related to vision correction or any specified disabilities.

⬛1 Vehicle Inspection and Use

Condition Of Vehicle

All drivers are responsible to make sure that their vehicle is safe, clean and in good repair. You are asked to perform a brief inspection for any obvious defects in the vehicle or safety systems and for any damage to the vehicle.

Obvious problems should be noted and the driver instructed to promptly repair any defects noted. The primary goal is to convey the company's expectation that vehicles be properly maintained. This is not meant to be a thorough safety inspection of all vehicle components.

- Check:
    * Lights (High and Low Beams: Park & Brake Lights)
    * Turn Signals (Front and Rear)
    * Emergency Flasher
    * Horn
    * Door Locks
    * Mirrors (Side and Rearview)
    * Instrument Lights
    * Windows

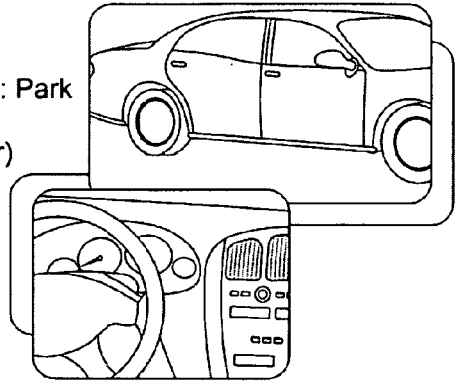

"Walk-around" the EXTERIOR:

- Check for damage to the body, glass or mirrors as well as flat, low or worn tires.

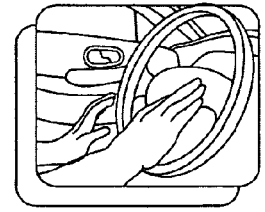

Check UNDER te vehicle for:

- Spills, puddles or any other signs of fluid leaking from the vehicle.

- Inquire of the driver regarding vehicle maintenance.
    * Last oil change
    * Check of fluid levels

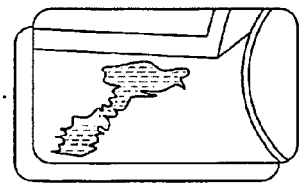

•••••••••••••••••••••••••• Vehicle Inspection and Use
Condition Of Vehicle

Vehicle Damage Must Be Reported:
All instances of vehicle damage, regardless of the cause or the extent of the damage must be promptly reported to the leasing company for insurance purposes. If physical damage is visible, note the nature of the damage and confirm the employee has reported the damage to the leasing company. If the damage has not been reported, instruct employee to do so within 24 hours.

- Once the engine is started, observe that there are no warning lights illuminated on the dashboard that may be indicative of other vehicle problems.

Secure Loose Articles:
The danger of having loose articles in the vehicle often goes unrecognized. Unsecured articles can become dangerous projectiles capable of causing serious injury in the event of an accident or sudden stop.

- Check for any loose articles
  * It is best to store items in the trunk
  * If this is not possible, place items on the floor in the back seat
  * Avoid storage of any items on the rear window deck

Seat Belt Use Required:
Observe that the employee properly fastens their seat belt.
If the employee fails to use their seat belt, direct he or she to do so, noting it is a company safety requirement.
Do not allow the employee to drive unless all passengers in the vehicle are properly belted.

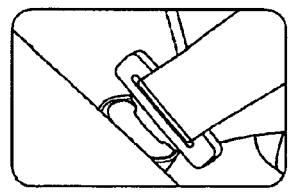

- Seat belts are your best protection against death or injury. They protect you in side impacts, rear-end collisions, roll over crashes and from being thrown from the vehicle.

2 | Vehicle Operation

●●●●●●●●●●●●●●●●●●●●●●●●●●●●●●●●●●●●●●●●●●●●●●●●●●●●●

Tailgating

The "3 Second Rule"

A large number of motor vehicle accidents in the field are rear-end collisions often caused by tailgating or otherwise following too closely. Utilize the 3 second rule to confirm adequate following distance, 4 seconds or more may be necessary under adverse conditions.

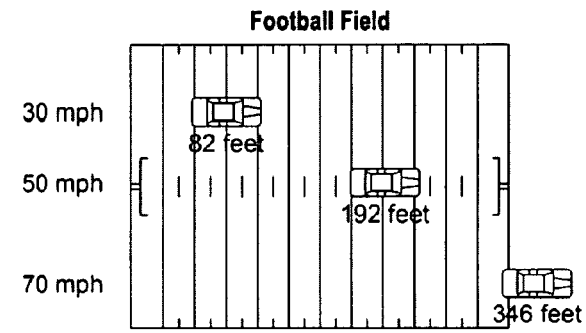

Stopping Distance

Stopping distance is the combination of Reaction Time and Braking Distance. That is how long it takes a driver under ideal conditions to recognize a hazard and bring the car to a complete stop.

Maintaining Proper Following Distance?

Drivers should maintain a gap of at least 3 seconds between their vehicle and the one they are following. Faster speeds require an increased spacing between vehicles.

The number of seconds between vehicles must increase as ideal weather conditions (rain, snow, fog, ice) decrease so that the driver has the proper room to maneuver.

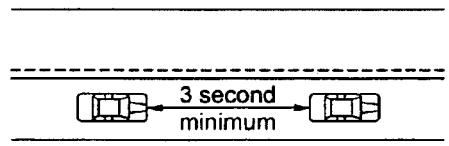

•••••••••••••••••••••••••••••••••• Vehicle Operation

Obey The Traffic Laws

THE TOP 10 DRIVING VIOLATIONS

- Speeding
- Failure to Yield the Right of Way
- Following To Closely
- Driving Under the Influence
- Disregarding Signs and Signals
- Unlawful Lane Changes
- Driver's License Changes
- Improper Turns
- Improper Backing
- Driving Under Suspension

Yield Means Yield
Yield signs assign the right of way to one group of drivers, while another group waits until it is safe to proceed. Before you proceed, you have to slow down and make sure that you can get into the traffic flow without interfering with their path of travel.

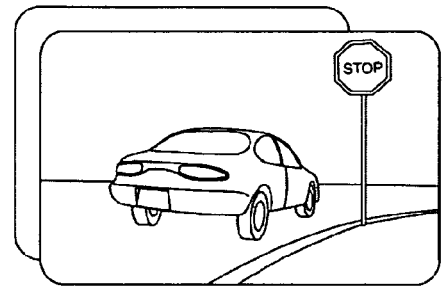

Emergency Vehicles
The rules for dealing with emergency vehicles are pretty simple. You have to get out of their way as quickly and
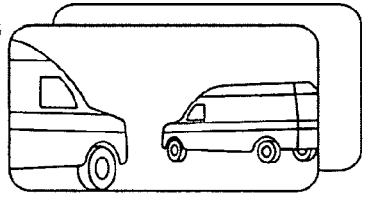
as safely as you possibly can. This is usually done by slowing, signalling and pulling over to the right as soon as you can safely do so. Pull back onto the road only when the emergency equipment has passed and you can safely re-enter traffic flow.

Stop Means Stop
Let's start with the obvious. Stop means stop. It does not mean roll, glide, slow down or give a quick glance down the street before entering an intersection.

Observing Highway Driving

Is the driver aware of which lane is the "correct" lane at any given time and, change as conditions change?
- Right lane (on and off highway)
- Middle lane (medium speed, more options)
- Left lane (higher speeds, passing).

Does the driver signal timely whenever changing lanes?

When entering or leaving the highway, does the driver?
- Signal properly and look for safe opening before entering the highway?
- Move into right lane well in advance of exiting?

Passing > > > > > > 

Faster > > > > 

Slow > > 

•••••••••••••••••••••••••••••••• Vehicle Operation
Drive Defensively

Defensive driving is based on being aware of all vehicles around you and anticipating potential hazards. Observe the driver with this in mind, noting potential aggressive driving actions such as swerving in and out of traffic, "squeezing" between other vehicles, speeding up to "beat" another car rather than yielding.

Is the driver aware of the importance of staying out of other vehicles' blind spots? Does the driver understand the visual limitations that the operators of large trucks, recreational vehicles, vehicles towing trailers, buses and other larger vehicles have?

Observing Driver's Scanning Techniques
Does the driver:
- Look to the horizon 12 to 15 seconds to see upcoming highway conditions and adjust accordingly.
- Regularly scan from side-to-side (building to building), (driveway to driveway) in order to better see vehicles, bikes, kids, pedestrians who may be entering roadway?
- Check the rear and side view mirrors to identify escape routes, if needed?

Acceleration and Braking
- Does the car lurch forward on acceleration? Watch for smooth acceleration techniques.
- Is the driver aware that he may have to brake soon, or does the driver constantly brake too late and end up too close to the vehicle in front of him when stopped?

Parking Lots and Backing Up

Whenever possible, drivers should pull through parking spaces. This ensures the greatest field of vision when pulling out and reduces the possibility of a parking lot collision.

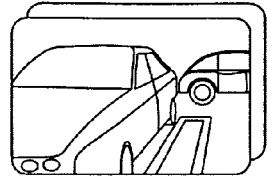

Cooperative or Competitive?
Does the driver's competitive nature spill over into driving?

Is the driver constantly trying to "win" whatever situation they're in on the highway always using the passing lane?

Consistently drives faster than rest of traffic?

Always ties to be the first person through a STOP intersection?

Runs red signals?

Rarely yields a lane to another driver?

Approaching Intersections

On approaching an intersection controlled by a traffic signal does driver:
- Slow down
- Cover the brake
- Watch for "stale" signals?

When turning left, does the driver keep wheels straight? This will help avoid being pushed into oncoming traffic if hit from behind.

Does the driver:
- Stop behind intersection limit lines
- Leave enough room so that he can see the bottom of the tires of the vehicle in front of him?

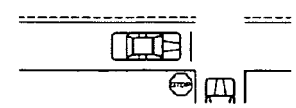

3 | Safety Attitude
••••••••••••••••••••••••••••••••••••••••••••••••

An Angry Driver?

Observe that driver takes action to avoid and steer clear of others exhibiting aggressive driving behaviors and does not react in an inappropriate manner by "retaliating" against other aggressive drivers.

Are the driver's emotions under control?

Does he overreact to other drivers' behavior?

Is he focused on one appointment that didn't go as planned, or on something else in his life that's causing emotions to boil over into anger (e.g., a family situation, a bonus not received, passed over for an advancement, etc.)?

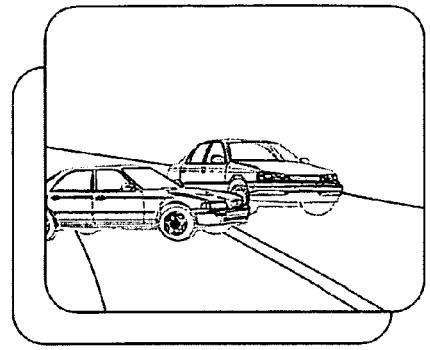

Does this anger manifest itself in driving behaviors such as:
- Tailgating?
- Flashing lights at other drivers?
- Speeding?
- Running lights and ...?
- Ignoring other signs, signals, road markings and highway conditions?

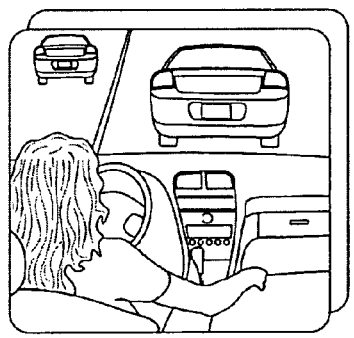

WHAT TO DO ABOUT TAILGATERS

More than 50% of all aggressive driving behavior is tailgating. Those inclined to follow us too closely are often angry, impatient and convinced that the car in front of them is responsible for holding them up. Similarly, that tailgater could actually be a mother trying to get her child to the hospital. We just don't know the reason. Regardless of the reason, the SMART-DRIVER'S response is the same, let them by!

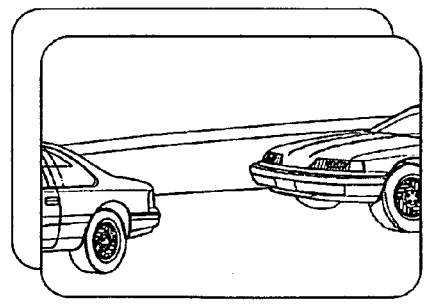

•••••••••••••••••••••••••••••••••••••••• Safety Attitude
Distracted Driver

"Distractions" are also a significant cause of accidents. Note any activities performed by the driver that appear to distract from keeping their eyes on the road and hands on the wheel. Hand held cell phones are only to be used when the vehicle is stopped. Only "hand-free" cell phones may be used when the vehicle is in motion, and only in accordance with any applicable state or local laws.

Vehicle Distractions

Does the driver:
- Talk on the phone?
- Take notes?
- Read?
- Eat or drink?
- Do anything else while driving that distracts from the driving task?
- Look at Tapes or CD's?
- Daydream?

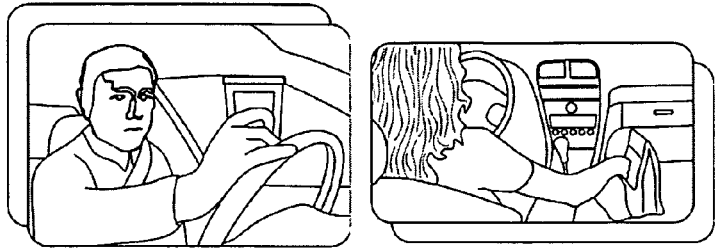

Keep your hands on the wheel and your eyes on the road.

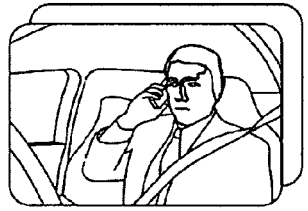

Cell Phones

- Studies have concluded that a driver talking on a cell phone, while the vehicle is in motion, is at least four times more likely of being in an accident.
- Certain States and Municipalities have enacted laws making cell phone use, while driving, a ticketable offense.
- Accident investigators and reconstructionists analyze whether the driver was talking on a cell phone at the time of the accident.

Time Management

- Is the driver's day well organized?
- Failure to be well prepared for the day can cause the driver to have many "other things" to think about rather than having their full attention on the road.
- Does the driver have everything needed for appointments (briefcase, laptops, samples, meeting notes, etc.)?
- Is the vehicle gassed up, clean and regularly maintained?
- As much as possible, are appointments scheduled so that they minimize travel time between calls? Is there a method, organization to the way the day is planned?
- When running behind schedule, does the driver call ahead to the person he is meeting, or do they just drive faster in the hopes of getting there on time?

4  Gold Cross Information
Manager's Driver Safety Observation

| Driver Name | Location/Territory |
|---|---|
| Manager | Date |

Mark X in box and make appropriate notes.

Vehicle Inspection and Use
- ☐ Exterior - Use "Walk Around" observation.
- ☐ Interior - Neat, no loose objects.
- ☐ Mirrors - Adjusted.
- ☐ Seat belts - Adjusted and worn.
- ☐ Hands on wheel at "9 & 3" position.
- ☐ Lights - Always on.

Vehicle Operation

Acceleration and Braking
- ☐ Smooth acceleration.
- ☐ Drives within posted speed limits.
- ☐ Brakes smoothly.
- ☐ "Covers" Brake pedal at areas of potential conflict.
- ☐ Maximizes "escape routes".

Following Distance
- ☐ Uses "3 second" Rule.
- ☐ Increases distance in foul weather.

Intersections
- ☐ Wheels kept straight waiting to turn.
- ☐ Cautious approaching "stale green" traffic light.
- ☐ First car in line - leaves space in front.
- ☐ At stop, driver can see rear tires of vehicle in front touching roadway.

Parking
- ☐ Pulls through stalls to park.
- ☐ Backs in, if unable to pull through.
- ☐ Sounds horn prior to backing.

Highways
- ☐ Maintains lane placement
- ☐ Signals when changing lanes, merging and exiting.
- ☐ Avoids "blind spot" driving.
- ☐ Uses deceleration lane, when exiting.

Scanning Techniques - Scans:
- ☐ To Horizon
- ☐ Side-to-Side
- ☐ To Rear
- ☐ Intersection prior to entering.

Safety Attitude

Driving Distractions
- ☐ Food, Drink or Note taking
- ☐ Anger, Attitude, or Fatigue

- ☐ Phone Use
- ☐ Time Management
- ☐ Focused on Driving Safety

Comments

• • • • • • • • • • • • • • • • • • • Driver's Walk-Around Vehicle Safety Inspection

| Division/Location | Vehicle No. |
|---|---|
| Current Mileage | Year/Make/Model |

Check item a if okay

Mark item X if Defective or Mechanical problem exists

Lights, Mirrors & Windows

- ☐ High Beams
- ☐ Stop Lights
- ☐ Windows
- ☐ Low Beam
- ☐ Turn Signals
- ☐ Mirrors
- ☐ Parking & Tail Lights
- ☐ Instrument Lights

Locks & Seat Belts

- ☐ Door Locks
- ☐ Trunk Lock
- ☐ Seat Belts

Tires

- ☐ LF
- ☐ RF

Under Hood Inspection

- ☐ Brake Fluid - reservoir at mark
- ☐ Coolant - recovery tank filled to Cold mark
- ☐ Power Steering Fluid - check warm, using dip stick
- ☐ Engine Oil Level - at FULL mark on dip stick
- ☐ Transmission Fuid - engine warm, running and gear shift in park (for automatics - only by knowledgeable person)
- ☐ Windshield Washer Fluid
- ☐ Engine and Transmission - sound "normal"
- ☐ Belts - okay, not frayed or cracked
- ☐ Horn - operates loudly

Vehicle Condition

- ☐ Bumpers
- ☐ Body Panels
- ☐ Hood and Roof

Describe all items marked with an X, defective items, mechanical problems, or body damage:

| Autorized Driver Signature | Date |
|---|---|

•••••••••••••••••••••••• Managers Completion Documentation

The following information will become part of your records               *Please print legibly*

---

Last Name                                    First Name                    Initial Address                                      City                          State      Zip Company               Division               Dept. No.                     Employee Number Date of Training _____

---

Statement to be provided for this area for Manager to sign

Signature _____

•••••••••••••••••••••••• Employee Completion Documentation

The following information will become part of your records   *Please print legibly*

| Last Name | First Name | Initial |
| Address | City | State   Zip |
| Company   Division | Dept. No. | Employee Number |
| Driver's License State | License Expiration Date | |

Statement to be provided for this area for employee to sign

Signature _____

DRIVER SAFETY PROGRAM

REFERENCE TO RELATED PATENT APPLICATION

This application claims priority benefit of provisional U.S. Patent Application Ser. No. 60/607,021, entitled MANAGERS DRIVER SAFETY OBSERVATION PROGRAM, filed on 3 Sep. 2004, which application is hereby incorporated by reference in its entirety, including all figures and tables.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates generally to the field of to driver safety and training programs. More particularly, the invention relates to customizable driver safety programs that integrate observational, written, and/or software components, and that can be delivered in whole or in part via multimedia presentation sources, such as the Internet.

BACKGROUND

For an employer, traffic accidents result in increased costs of conducting business. The costs of accidents include legal fees and settlements; workers compensation, health and vehicle insurance; and employees' time off work. Many of these costs, particularly costs of insurance, have being increasing at a rate faster than the rate of consumer price inflation. Yet driving is often an almost indispensable part of conducting business. This is particularly true for companies with representatives and sales people who need to visit existing and potential customers on a regular basis. In order to reduce accident costs, many companies that need employees to drive regularly on company business implement driver safety and training programs.

Conventional driver safety programs typically employ "commentary drives" in which a manager (1) rides with an employee who drives one or more company vehicles (for example, cars, vans, or trucks), and (2) evaluates and critiques the employee's actions behind the wheel in a number of specific categories, such as vehicle spacing (tailgating), use of directional signals, seat belt use, observation of traffic control devices, and similar driving behavior. The manager instructs the employee-driver as to the proper methodologies for these categories during the commentary drive; the manager may also provide a written and/or verbal report to the employee-driver, the company, or both.

The conventional driver safety programs suffer from several drawbacks. First, most managers receive limited, if any, training in evaluating and correcting driving habits of employees. For example, the training may be limited to reading a short pamphlet or attending a limited scope course. Such limited training may not properly prepare the manager to educate the employee regarding proper driving habits, techniques, and laws.

Second, it should be remembered that the manager has other duties—e.g., sales performance management—which the manager probably considers to be his or her primary job duties. While such assessment of the relative importance of the various duties by the manager may be correct, it is likely to lead the manager to place insufficient emphasis on the driver training of the employees supervised by the manager.

Third, during the commentary drive the manager's attention may be diverted to a new driver problem before the manager fully addresses a previous driver problem. The manager may thus neglect to provide an adequate explanation of how to correct the previously-identified driver problem.

Fourth, the corrective effect of the commentary provided during the commentary drive may be both weak and short-lived, because both the employee-driver and the manager are preoccupied with other tasks and discussions during the drive. The attention of the employee-driver is necessarily divided between (1) actual driving, and (2) absorbing and responding to the comments provided by the manager. Similarly, the manager's attention may also be divided between (1) evaluating the actual driving of the employee-driver, (2) commenting on the problem driving behavior seen, and (3) taking written notes for a report. Such "multitasking" interferes with proper instructions by the manager, and with learning and retention of the learned material by the employee-driver.

Fifth, the manager may not be aware of information that, if it were known to the manager, would affect the manager's evaluation and the commentary provided to the employee-driver. For example, the manager may not be aware of the health status and typical driving patterns of the employee-driver, and of the mechanical state of the vehicle used during the commentary drive. For example, the manager may not be aware that the employee-driver requires corrective lenses for driving, or that the employee-driver takes medications that induce drowsiness. Because the employee-driver is likely to be on his or her best driving behavior during the commentary drive, the manager may also not become aware that the employee-driver has formed unsafe or otherwise undesirable driving habits, such as hard acceleration and braking, or excessive speed in turns. Similarly, the manager may not be aware that the employee does not schedule his or her daily appointments in a preferred sequence (generally, the first appointment of the day should be geographically farthest from home or office location of the employee-driver).

Sixth, after evaluating the employee-driver and commenting on the drive, typically very little—if any—further training takes place; and if further training does take place, it is usually generalized training, not specifically targeted to correct the problem driving behavior that the manager noticed in the course of the commentary drive, or the problem driving behavior exhibited by the employee-driver at other times.

Seventh, the critiquing portion of the commentary drive may engender or enhance personal tensions between the manager and the employee-driver. Critiquing and criticizing in an inoffensive way is an art possessed by few, and even the gentlest of criticisms may offend some people.

These shortcomings pose potential risk management and liability problems, and may cause decreased employee performance.

SUMMARY

A need thus exists for improved methods and systems for designing and delivering driver training programs.

Embodiments of the present invention are directed to a driver training program method for improving driving skills behaviors of a participant. In accordance with the method, a manager of the participant's company conducts an observation drive with the participant. During the observation drive, the manager makes observations regarding the participant's driving skills and behaviors, but does not comment or critique the participant's driving skills and behaviors. After the observation drive, the manager generates an observation drive report that includes the manager's observations of driver skills and behaviors made during the observation drive. The information from the observation drive report is added to a collection of information relating to driver skills and behaviors (e.g., motor vehicle violations report, accident history, and similar information) of the participant. The collection of information may reside in a database or another central repository of information. After the information from the observation drive report is added to the collection of information, the information relating to driver skills and behaviors of the participant in the collection of information is analyzed to determine a driver training curriculum for the participant. The curriculum is designed specifically for the participant based on the information relating to the participant's driver skills and behaviors.

In accordance with selected aspects of the invention, the manager confers with the participant to discuss the observations regarding the driving of the participant. During the conference, the manager presents factual information to the participant regarding the observations, without commenting or critiquing the driving skills and behaviors of the participant. Furthermore, the manager elicits from the participant (1) a list of one or more areas of driving competence in which the performance of the participant can be improved, (2) a list of one or more lessons that would help the participant to improve driving performance, and/or (3) a list of one or more additional skills that would help the participant to improve driving performance. The information on the list or lists is added to the collection of information relating to the driver skills and behaviors of the participant before the information is analyzed to determine the curriculum.

In accordance with selected aspects of the invention, a psychological profile of the participant is obtained and information from the profile is added to the collection of information relating to the driver skills and behaviors of the participant before the information is analyzed to determine the curriculum. The profile may be a DISC (Dominance/Influence/Steadiness/Compliance) profile.

In accordance with selected aspects of the invention, driving of the participant is monitored to obtain actual driving information of the participant. The actual driving information is added to the collection of information relating to the driver skills and behaviors of the participant before the information is analyzed to determine the curriculum. The driving of the participant may be monitored using a global positioning system and a vehicle computer. The vehicle computer can be equipped with an acceleration/braking sensor, cornering force sensor, speed sensor, tire pressure sensor, fuel monitoring sensor, time and location sensor, and/or maintenance sensor.

In accordance with selected aspects of the invention, the participant's driving record (a record of traffic accidents, warnings, citations, and convictions for traffic violations) is obtained and information from the driving rectors is added to the collection of information relating to the driver skills and behaviors of the participant before the information is analyzed to determine the curriculum.

In accordance with selected aspects of the invention, the manager examines the vehicle used in the observation drive to obtain information regarding safety, physical, and mechanical state of the vehicle, and compiles a report with this information for submission to a vehicle fleet department.

In accordance with selected aspects of the invention, the manager compiles a report including information regarding at least one of: identified needs of the participant relating to driver skills and behaviors, and suspected problems of the participant relating to driver skills and behaviors. The manager submits this report to a department capable of acting on the information in the report, for example, to human resources and/or benefits department.

In accordance with selected aspects of the invention, the information relating to driver skills of the participant is analyzed to schedule the next observation drive with the participant.

In accordance with selected aspects of the invention, at least a portion of the driver training curriculum is delivered to the participant over a network, for example, the Internet.

These and other features and aspects of the invention will be better understood with reference to the following description, drawings, and appended claims.

BRIEF DESCRIPTION OF THE FIGURES

FIG. 1 shows a table of contents of a driver training program, in accordance with an embodiment of the present invention;

FIG. 2 shows a sheet instructing the person in charge of the observation and reporting components of the program to ascertain that the program participant has a valid driver license in the proper state, in accordance with an embodiment of the present invention;

FIGS. 3A and 3B show sheets instructing the person in charge of the observation and reporting components of the program regarding inspection and use of the vehicle to be used in the observation component of the program, in accordance with an embodiment of the present invention;

FIG. 4 shows a sheet with instructions regarding maintaining proper vehicle following distance and the related "Three Second Rule," in accordance with an embodiment of the present invention;

FIG. 5 shows a sheet with instructions regarding top ten driving violations, in accordance with an embodiment of the present invention;

FIG. 6 shows a sheet with instructions regarding defensive driving techniques, in accordance with an embodiment of the present invention;

FIGS. 7A and 7B show instructions regarding safety attitude during driving, in accordance with an embodiment of the present invention;

FIG. 8 shows a Driver Safety observation form for reporting observations relating to driver safety made during an observation drive, in accordance with an embodiment of the present invention;

FIG. 9 shows a Walk Around Vehicle Safety Inspection observation form for reporting observations relating to the vehicle used in the observation drive, in accordance with an embodiment of the present invention;

FIG. 10 shows a Managers Completion Documentation form, in accordance with an embodiment of the present invention;

FIG. 11 shows an Employee Completion Documentation form, in accordance with an embodiment of the present invention.

DETAILED DESCRIPTION

Figure 12:
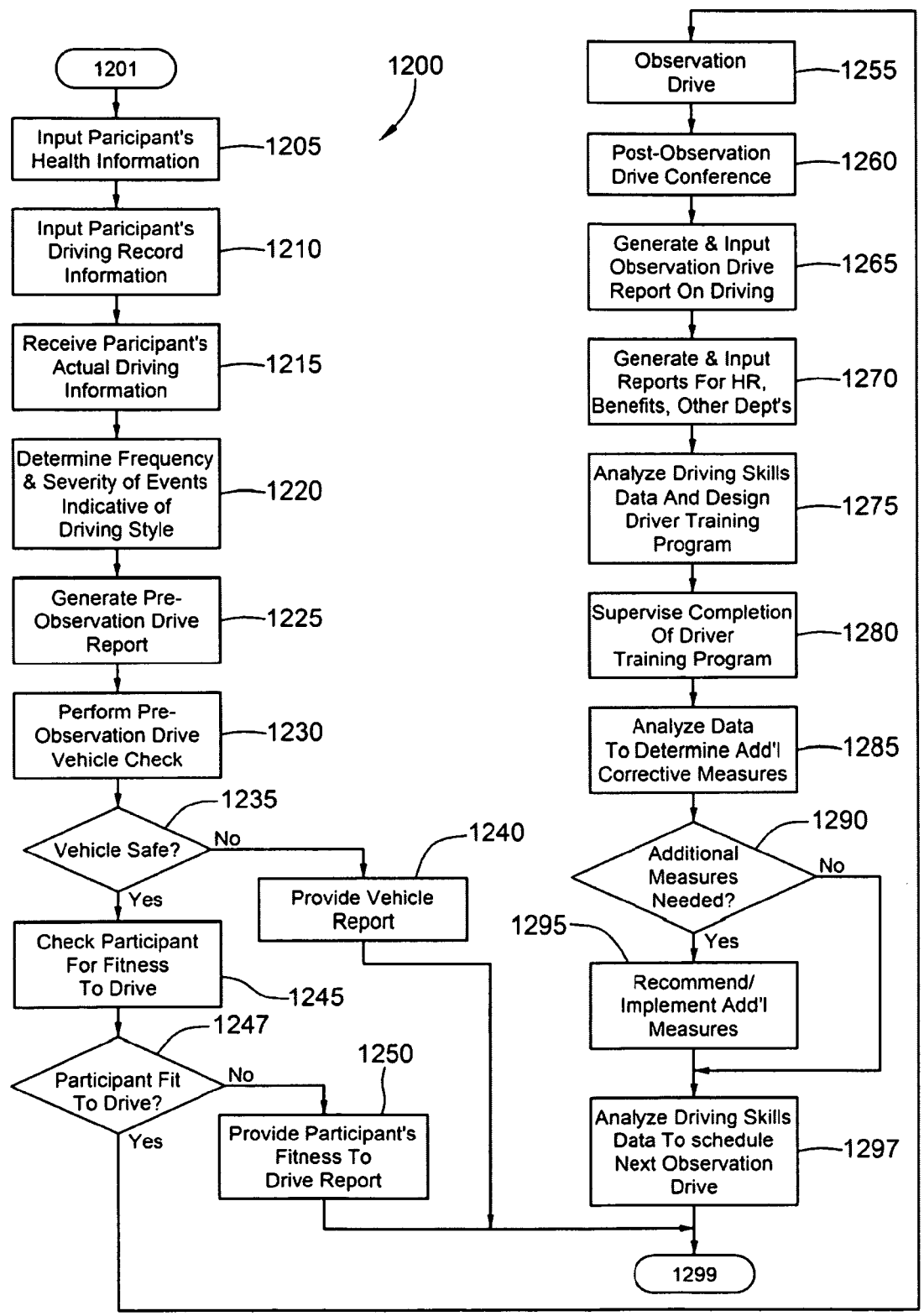
FIG. 12 illustrates a process of providing a driver safety program, in accordance with an embodiment of the present invention.

In this document, including the specification and appended claims, the words "embodiment" and "variant," as well as similar expressions, refer to particular apparatus, process, or article of manufacture, and not necessarily to the same apparatus, process, or article of manufacture. Thus, "an embodiment," "one embodiment," "some embodiments" or a similar expression used in one place or context can refer to a particular apparatus, process, article of manufacture, or a plurality thereof; the same or a similar expression in a different place can refer to the same or a different apparatus, process, article of manufacture, or a plurality thereof. The expressions "alternative embodiment," "alternatively," and similar phrases are used to indicate one of a number of different possible embodiments. The number of possible embodiments is not necessarily limited to two or any other quantity.

The words "couple," "connect," "attach," and similar expressions with their inflectional morphemes do not necessarily import an immediate or direct connection, but include connections through mediate elements within their meaning.

An "expert system" is a computing machine executing instructions of a computer program or set of programs that contain a body of knowledge about a particular domain, and a set of rules for the application of this knowledge to specific problems.

The word "company" refers to any kind of business entity that uses a driving training program to improve driving skills of persons working for the business entity, including sole proprietorships, general and limited partnerships, corporations, and limited liability companies.

"Driver improvement program," "driver education program," "driver training program, "driver improvement program" and similar expressions refer to company programs for enhancing driving skills of persons working for the company.

The expression "employee-driver" and the word "participant" are used interchangeably to refer to a person participating in a driver training program for the purpose of improving driver skills of the person.

"Actual driving information" and "actual driving pattern" refer to information regarding actual driving obtained through automated means during actual driving by a participant, for example, using a global positioning system and/or vehicle computer installed in the participant's vehicle.

Other definitions may be found elsewhere in this document. The scope and spirit of the invention should not be construed as strictly limited to these definitions, or to the specific examples mentioned herein.

Reference will now be made in detail to one or more embodiments of the invention that are illustrated in the accompanying drawings. Same or similar reference numerals may be used in the drawings and the description to refer to the same apparatus elements and method steps. The drawings are in simplified form, not to scale, and omit apparatus elements and method steps that can be added to the described systems and methods, while including certain optional elements and steps.

Features of the present invention are implemented in the Gold Cross Manager's Observation Program of the assignee of the invention. Some of these features are described below, but the description may go beyond what is available in the program.

The program materials can include audio, video, and/or written Leader Guides for manager training specific to corporate driver safety policy. The Leader Guides can integrate workbook presentations on various technological platforms, including platforms capable of delivery over a network (the Internet, an intranet, an extranet or any other kind of public or private network) and various multimedia delivery methods, including CD/DVD presentations, and presentations stored on other memory devices, for example, presentations stored in magnetic disk drives and flash memories. The presentations may be delivered using a single delivery method (e.g., delivery of all materials over the Internet) or using a combination of different delivery methods (e.g., delivery of materials over the Internet and from a local CD/DVD drive). The presentations may be delivered over wired connections, wireless connections, or combinations of wired and wireless connections.

In addition to the Leader Guides, the program can include observation forms that the manager conducting the program (or a portion thereof) can fill out and provide to the appropriate departments within the company that uses the program. The appropriate departments may include a safety department, human resources department, benefits department, risk management department, fleet department, and various corporate committees. (The preceding list of departments is not exclusive.) The observation forms may provide information regarding vehicle operation, driver attitude, driver condition, vehicle condition, and physical damage to the vehicle.

FIGS. 1 through 11 show selected written materials of the Program (Leader Guides, observation forms, and related materials), as follows:

FIG. 1 shows a table of contents;

FIG. 2 shows a sheet instructing the manager to make certain that the employee-driver (participant) has a valid driver license in the proper state;

3A and 3B show sheets instructing the manager regarding inspection and use of the vehicle to be used in the observation component of the program;

FIG. 4 shows a sheet with instructions regarding maintaining proper vehicle following distance and the related "Three Second Rule";

FIG. 5 shows a sheet with instructions regarding the top ten driving violations;

FIG. 6 shows a sheet with instructions regarding defensive driving techniques;

FIGS. 7A and 7B show instructions regarding safety attitude during driving;

FIG. 8 shows a Driver Safety observation form;

FIG. 9 shows a Walk Around Vehicle Safety Inspection observation form;

FIG. 10 shows a Managers Completion Documentation form; and

FIG. 11 shows an Employee Completion Documentation form.

In accordance with the method of the program, the manager simply observes the driving skills and behavior of the employee and reports his or her observations through proper company channels. The manager may also discuss the observations with the employee-driver during a conference that follows the observation drive. The manager's reporting may include complete vehicle inspection results, operating observations, driver attitude assessment, and other observations and assessments. Reporting forms are broken down by extensive categories for each individual segment.

In this way, the manager is in a better position to observe during the observation drive portion of the program, rather than having to conduct a complete commentary drive with the employee-driver. The potential of less than adequate or wrong instruction is thus reduced. The program does not put the manager in a position of having to critique the employee-driver directly, thus avoiding or reducing potential conflict and concomitant strain on the relationship between the manager and the employee-driver.

Based on the manager's observations in specific categories and on other data, the company can provide the employee-driver with targeted training configured to address weaknesses in driving skills. In addition, the vehicle condition report, which is part of the program, provides the company with a description of the physical condition and possible lack of maintenance of the vehicle. The company is then better able to address any shortcomings in the maintenance of the vehicle that would potentially reduce the vehicle's value from a business use effectiveness perspective and the ultimate value of the vehicle obtained upon the vehicle's disposal. The program's Leader Guides and video, audio, and software components provide a systematic methodology that can integrate the company's fleet, safety, and sales sectors within specific company policy guidelines. Moreover, potential health-related issues of the employee-driver, such as impaired hearing, impaired vision, excessive fatigue, excessive preoccupation, and depression can be detected early and more reliably from the information in the manager's observation and assessment forms, as well as from other information available to the company.

The manager may be trained and have available to him or her specific state law information and company fleet and safety policies, which the manager can discuss with the employee-driver. The manager may also have available for discussion with the employee-driver research that has previously established conclusions applicable to specific driver behavior. This discussion may include a systematic disclosure of facts, rather than a critique of the employee-driver. The facts may include a detailed list of observations made by the manager during the observation drive, traffic laws, traffic safety research, and applicable corporate safety policy. Again, the manager can make specific, factual statements regarding the corporate policy and the traffic laws, rather than critique behind-the-wheel performance of the employee-driver.

In more detail, the manager conducts an observation drive/overview with the employee-driver. During the observation drive, the manager observes the driving skills and behavior of the employee-driver and makes corresponding observation notes. For example, the manager can write observation notes or fill-in appropriate observation forms on a notebook computer, tablet computer, personal digital assistant, or a similar device. The device may be a wireless device, enabling the manager to transmit the observation notes during or at the conclusion of the observation drive to a central repository of data that stores information about the employee-driver and/or the vehicle. Alternatively, the manager can transmit the observation notes to the central repository at a later time.

The central repository can be a data base or a file (physical or electronic) in an appropriate department within the company.

The manager's observations may include observations regarding the employee-driver's observance of speed limits, seatbelt use, tailgating, use of cellular telephone during driving, driving hazard perception, driving attitude, recognition of traffic control devices, choice of route, emotional state (preoccupation with personal problems, road rage) and similar subjects.

Advantageously, the manager does not try to improve the driver's driving skills during the observation drive and, generally, does not comment regarding the driving at the time of the observation drive. This does not preclude the manager from communicating to the driver regarding emergencies or clear violations of the applicable traffic laws and of the corporate safety policy. The manager, however, does not attempt to correct or improve the driving skills and techniques of the employee-driver.

After the observation drive, the manager has a post-observation drive conference with the employee-driver. The conference may take place immediately following the observation drive, or at a later time, for example, within a few hours. The time period between the observation drive and the conference allows the manager to analyze the facts observed and possibly receive additional information regarding the employee-driver. As will be discussed in more detail below, the additional information may include non-confidential medical information, actual driving information and driving record of the employee-driver, and psychological profile of the employee-driver. This information may also be provided to the manager before the observation drive.

In the course of the conference, the manager itemizes the manager's observations regarding the driving of the employee-driver made during the observation drive. The manager may also request the employee-driver to perform a self-assessment. For example, the manager may ask the employee-driver to list areas of driving competence in which the employee-driver feels his or her performance can be improved, and to suggest lessons or additional skills that would help the employee-driver to improve driving performance and become a better and safer driver. The manager sends the self-assessment of the employee-driver to the central repository.

Either before or after the observation drive, the employee-driver can be asked to take a "DISC" (Dominance/Influence/Steadiness/Compliance) personality profiling analysis to help determine the type of driver training program that may benefit that driver based on his or her specific personality profile. The DISC personality test may be administered over a network, for example, over the Internet, an intranet, an extranet, or another kind of public or private network. The results of the DISC analysis are also transmitted to and stored in the central repository of data.

It should be noted that other personality profiling techniques may be substituted for, or used in conjunction with, the DISC analysis.

As briefly mentioned above, the driving record of the employee-driver may also be obtained and inputted into the central repository, either before or after the observation drive. For example, the driving record may be obtained after receiving the employee's consent prior to or after commencement of employment. The manager may also be provided with the driving record of the employee-driver. The driving record may include, for example, a record of warnings, citations, and convictions for traffic violation, and a record of accidents (at fault and not at fault) in which the employee-driver has been involved. The record may further include the number of miles driven by the employee-driver within some period, so that the traffic violations, citations, and accidents can be evaluated in the context of total mileage driven.

The central repository may further contain the actual driving information of the employee-driver. For example, the vehicle of the employee-driver may be equipped with a global positioning system that logs the vehicle's position continually throughout the day of driving. The routes taken by the employee-driver on various days can then be easily evaluated for efficiency or lack thereof. Similarly, out-of-the-area incidents can be detected. Such incidents may indicate unauthorized use of the vehicle, unauthorized time off work, or getting lost.

Furthermore, a vehicle computer connected to appropriate sensors (for example, acceleration/braking, speed, and cornering "g-forces" sensors) may be installed in the vehicle, either alone or in combination with a global positioning system. The computer can then log acceleration, braking, absolute speed, and cornering forces data for subsequent assessment by a representative of the safety department. These data may also be evaluated automatically, by a computer-based expert system. Driving patterns of the employee-driver in the course of a normal day may then be revealed and, as will be seen in more detail below, considered as part of the total assessment of his or her driving skills and behaviors.

The central repository may also contain a record of previous driver training completed by the employee-driver.

An appropriate driving improvement program is determined and prescribed for the employee-driver after the observation drive, conference with the manager, and possibly other assessments (e.g., DISC analysis) and evaluations (e.g., evaluation of the driving record and actual driving information). Advantageously, the prescribed driving improvement program emphasizes training designed to eliminate deficiencies in the driving skills and behaviors of the specific participant, as has been determined based on the information regarding the driving skills and behaviors of the employee-driver stored in the central repository, such as the manager's observations and other assessments and evaluations. Components of the prescribed training that address areas of strength in the participant's driving skills may be de-emphasized or even omitted from the prescribed driver training program. Conversely, components of the prescribed training that address areas of weakness in the participant's driving skills and behaviors may be emphasized or added to the prescribed driver training program.

Actual determination of the driving improvement program for the employee-driver may be determined by a person properly qualified in driver assessment and training. This person may be an internal corporate person or an external expert. One advantage of having another person prescribe appropriate training is that the criticism implicit in the determination is not provided by the participant's manager, avoiding the conflict that may spill into other aspects of the relationship between the manager and the participant. As has already been mentioned, the manager of the employee-driver merely observes (during the observation drive) and then details the observations during the conference. The manager is thus likely to appear to the employee-driver in a less confrontational stance.

Advantageously, the task of prescribing appropriate training may be performed by a person who specializes in such tasks. The person may be an outside consultant of the company or another external business entity.

The determination of the appropriate driver training may also be done objectively, by an expert system. For example, the determination may be performed by a computing device running under program control. The program receives from the central repository (data base) the data pertaining to the driving skills of the employee-driver, such as the driving record, actual driving patterns, manager's observations, DISC or other personality profile, and health-related information. The program then applies predetermined rules to the data pertaining to the participant's driving skills, and arrives at the appropriate training for the employee-driver.

In various embodiments of the processes and systems, the prescribed training may include assignment of written materials, audio materials, video materials, software-based materials, or a combination of these and other materials. The materials may be interactive, and their presentation may be performed by a computer, via a network (e.g., within a client-server model), or from locally stored presentation data. Exemplary embodiments include components intended to improve the participant's hazard perception, driving attitude, recognition of traffic control devices, alertness during driving, understanding of and adherence to rules for keeping a proper following distance, cellular telephone use, seatbelt use, observance of speed limits, and/or other human factors bearing on safe driving by the participant.

In addition to the driver training, the company may take other measures to improve driving safety. For example, if the employee-driver is judged to have a distractible personality or a personality otherwise associated with an increased risk of traffic accidents, the company may prohibit him or her from using a cellular telephone when driving. As another example, the company may authorize installation of a navigation system in the vehicle of an employee who tends to become confused or lost relatively easily. By way of still another example, driving patterns of an overly-aggressive driver may be monitored using the global positioning system and/or vehicle computer (as described above) on a daily basis or periodically.

Presentation of the training materials may (but need not) be performed and monitored by the same computer system that is used for the expert system that prescribes the training. The computer system may include a processor executing computer instructions, memories (including instruction memory), network interface, video display, printer, pointing device, keyboard, storage device (e.g., hard disk drive), CD/DVD/FLASH drives, scanners, and other devices connected to each other. Such systems would be known to a person skilled in the pertinent art and could be readily obtained or built without undue trial and error or experimentation.

The computer instructions executed by the computer system may be stored in articles of manufacture, for example, on magnetic disks, CD-ROMs, DVDs, flash memories, battery-backed memories, and similar devices.

The manager's observations regarding vehicle inspection, vehicle operation, driver attitude, and/or vehicle physical damage may also be provided to the central repository and then distributed to appropriate departments, whether over the Internet, an intranet, an extranet, or using any other form of communication. For example, the manager's observations regarding the vehicle can be transmitted to the fleet, maintenance, and/or safety departments. The appropriate department is then in a position to take action to remedy deficiencies in vehicle maintenance observed by the manager. The deficiencies may include, for example, chips in the windshield, bald tires, rust and other body defects, worn out wipers, various leaks, and similar maintenance items.

The manager's observations relating to the employee-driver can be combined with other data regarding the employee stored in the central repository and analyzed to determine whether the employee-driver's circumstances merit or require referral to one or several departments within the company, such as the benefits and human resources departments. For example, the employee-driver may be referred to the employee benefits department for help in correcting vision or hearing problems, or to the human resources department for subsequent referral to an "Employee Assistance Program" if the manager's observations and/or other information indicate potential substance abuse. In extreme cases, the employee-driver may be re-assigned or otherwise prevented from driving on company's business, either temporarily or permanently.

FIG. 12 illustrates an exemplary process 1200 of providing a driver safety and training program. Although the process steps and decisions are described serially, certain steps and decisions may be performed by separate elements or actors in conjunction or in parallel, asynchronously or synchronously, in a pipelined manner, or otherwise. There is no particular requirement that the steps and decisions be performed in the same order in which this description lists them, except where a specific order is inherently required, explicitly indicated, or is otherwise made clear from the context. Furthermore, not every illustrated step and decision block may be required in every embodiment in accordance with the invention, while some steps and decision blocks that have not been specifically illustrated, may be desirable or necessary in some embodiments. It should be noted, however, that a particular embodiment uses the specific steps and decision blocks that appear in FIG. 12 in the particular order shown in FIG. 12.

The process begins at flow point 1201.

At step 1205, information regarding health of a participant (e.g., employee-driver) is assembled and provided to an expert system. For example, health-related information may include information regarding the participant's vision, hearing, and use of prescription drugs that tend to induce drowsiness.

At step 1210, information regarding the participant's driving record and driver training is provided to the expert system. The driving record information may include number and severity of accidents and traffic violations during a predetermined time period, as well as the number of miles driven by the participant during the same or a different period. The driver training information includes information regarding driver training previously completed by the participant.

At step 1215, the expert system retrieves or receives actual driving information for the participant during the same or a different time period. The actual driving information may include information received from the global positioning system and the vehicle computer installed in the participant's vehicle, as has already been described in this document.

The expert system adds the information received in the steps 1205, 1210, and 1215 to the database that stores information regarding the participant (if the information is not already there).

At step 1220, the expert system examines the actual driving information and determines the relative frequency (time- or mileage-based) and severity of events indicative of driving style of the participant, such as incidents of abrupt braking, acceleration, high cornering forces, and high speed.

At step 1225, the expert system generates a pre-observation drive report for the manager (i.e., the person who will administer the observation drive). The pre-observation drive report may include a participant-specific listing of driving behavior traits that the manager should pay particular attention to during the observation drive. The driving behavior traits are inferred from the driving record, actual driving information, and/or health information received in the previous steps, and possibly from other information, such as the participant's psychological profile.

At step 1230, the manager performs a pre-observation drive vehicle examination. The vehicle examination includes a safety check and a simple check of the mechanical state of the vehicle, including, for example, a check for body damage, tire pressure and tread (including the spare), wipers, fluid levels, windshield, and a record of vehicle maintenance. The manager records his or her observations relating to the state of the vehicle.

At decision block 1235, the manager decides whether the vehicle is safe for the observation drive. If the vehicle is not safe, the manager provides an appropriate report to the safety and vehicle maintenance departments, at step 1240. The manager may also provide this information to the expert system. The process 1200 then terminates at flow point 1299, to be rescheduled for another time.

If the vehicle is safe, the manager performs a pre-observation drive check of the participant, at step 1245. For example, the manager may verify that the participant possesses a valid driver license in the state of the participant's residence, and that the participant's physical and mental conditions are safe for driving. If the participant does not possess a valid license, is drowsy, or is too preoccupied or too tired for the observation drive, as the manager determines at decision block 1247, the manager generates an appropriate report and provides the report to the safety, human resources, and/or benefits departments, at step 1250. The manager may also provide this information to the expert system. The process 1200 then terminates at flow point 1299, possibly to be rescheduled for a later time. Otherwise, the manager records observations regarding the participant's state for an observation drive report.

After both the Vehicle and the participant can proceed with the observation drive, the manager conducts the observation drive, at step 1255. The manager does not provide commentary to the participant during the observation drive, but makes observations and takes notes. As noted above, the manager can communicate with the participant regarding emergencies or clear violations of the applicable traffic laws and of the corporate safety policy. The manager, however, does not attempt to correct or improve the driving skills and techniques of the participant during the observation drive.

At step 1260, the manager conducts a post-observation drive conference with the participant. In the course of the conference, the manager discusses factual observations made during the observation drive, and asks for the participant's assessment of his or her driving skills and a list of areas where the participant feels driver training would be beneficial. The manager may also discuss research that has previously established conclusions applicable to specific driver behavior. Generally, the manager keeps this discussion factual and does not attempt to conduct driver training during the conference.

At step 1265, the manager generates an observation drive report. A form with standardized assessment and evaluation marks is used for this purpose. The report includes the manager's observations regarding physical and mental state of the participant, and the participant's observance of speed limits, seatbelt use, tailgating, use of cellular telephone during driving, driving hazard perception, driving attitude, recognition of traffic control devices, choice of route, and other related subjects. The information also includes the participant's self-assessment of driving skills, such as a list areas of driving competence in which the participant feels his or her performance can be improved, and suggested lessons or additional skills that would help the participant to improve driving performance and become a better and safer driver. The information on the post-conference report form is inputted into the expert system and added to the database that stores information regarding the participant.

At step 1270, the manager generates reports for various departments of the company, such as human resources, benefits, and fleet maintenance departments. By way of example, the expert system may generate and distribute a report to the fleet maintenance department, which includes the manager's observations relating to the state of the vehicle (obtained in the step 1230). The reports to human resources and benefits departments may include the manager's observations regarding the needs and suspected problems of the participant, and suggestions for helping the participant. For example, the manager can suggest a vision or a hearing examination for the participant.

At step 1275, the expert system analyzes the information relating to the driver skills and behaviors of the participant and, based on the results of this analysis, generates a driver training program curriculum for the participant. The information affecting the analysis and curriculum choice may include the following:

1. The manager's observations during the observation drive,
2. The participant's self-assessment;
3. The participants psychological profile;
4. The participant's previous driver training;
5. Actual driving data;
6. The participant's driver record; and
7. Any other information that can help to fine-tune the program to meet the participant's driver training needs.

The expert system then sends the descriptions of the recommended driver safety training course to appropriate recipients through preselected company channels. For example, the information may be sent via email to the human resources department, safety department, fleet management department, risk management department, other departments, the participant, and the manager.

At step 1280, the expert system supervises the participant's completion of the driver training program. For example, the system can interface with internal and/or external sources of driver training-information to deliver program materials to the participant. The system can also verify the participant's review of the materials. Verification can be performed by periodically spawning an applet on the participant's computer, asking the participant to click or perform another action that would verify that the participant is at the computer. All or portions of the driver training may be administered using the expert system. The expert system records the participant's completion of the driver training program for future reference.

At step 1285, the expert system analyzes the information regarding the driving skills of the participant (for example, the information listed above in relation to the step 1275 or a subset thereof), and, based on this analysis, determines whether and what additional corrective measures are needed. If additional measures are needed, as determined in decision block 1290, the expert system recommends and/or implements such corrective measures, in step 1295. Otherwise, the step 1295 is bypassed. The information analyzed in this step may be the same or a subset of the information listed above in relation to the step 1275.

After the step 1295 (if additional measures are needed) or after the decision block 1290 (if the additional measures are not needed), process flow advances to step 1297. In this step, the driving skills and behaviors data is analyzed once again to schedule the next observation drive. The analyzed data may be the same or a subset of the data listed in relation to the step 1275.

Upon completion of the above steps, the process 1200 terminates at the flow point 1299.

This document describes the inventive processes and systems for providing driver training program in considerable detail. This was done for illustration purposes only. Neither the specific embodiments of the invention as a whole, nor those of its features limit the general principles underlying the invention. The specific features described herein may be used in some embodiments, but not in others, without departure from the spirit and scope of the invention as set forth. Many additional modifications are intended in the foregoing disclosure, and it will be appreciated by those of ordinary skill in the art that in some instances some features of the invention will be employed in the absence of a corresponding use of other features. The illustrative examples therefore do not define the metes and bounds of the invention and the legal protection afforded the invention, which function is carried out by the claims and their equivalents.

I claim:

1. A computer-implemented driver training program method for improving driving skills and behaviors of a participant, the method comprising:
   storing in a memory a collection of information relating to driver skills, attitudes, and behaviors of the participant;
   obtaining a psychological profile of the participant, wherein the psychological profile is a Dominance/Influence/Steadiness/Compliance (DISC) psychological profile of the participant, and the step of obtaining is performed over a network at a time other than an observation drive with the participant;
   adding information from the psychological profile to the collection of information relating to the driver skills, attitudes, and behaviors of the participant;
   analyzing the collection of information relating to driver skills, attitudes, and behaviors of the participant to determine a driver training curriculum for the participant, wherein the collection of information comprises an observation drive report comprising observations regarding driving of the participant made by an observer during the observation drive with the participant, the step of analyzing being performed by a computing device running under program control;
   wherein:
   the observer conducts the observation drive; and
   the step of adding is performed before the step of analyzing so that the step of analyzing is based at least in part on the psychological profile.

2. A computer-implemented driver training program method according to claim 1, further comprising:
   delivering a list a portion of the curriculum to the participant.

3. A computer-implemented driver training program method according to claim 2, the method further comprising:
   before the step of analyzing the collection of information relating to driver skills, attitudes, and behaviors, adding a list of one or more areas of driving competence in which the performance of the participant can be improved to the collection of information relating to the driver skills, attitudes, and behaviors of the participant, wherein the list of one or more areas is received from the participant during a conference after completion of the observation drive.

4. A computer-implemented driver training program method according to claim 3, the method further comprising:
   before the step of analyzing the collection of information relating to driver skills, attitudes, and behaviors, adding a list of one or more lessons to the collection of information relating to the driver skills, attitudes, and behaviors of the participant, wherein the list of one or more lessons is received from the participant during the conference.

5. A computer-implemented driver training program method according to claim 4, the method further comprising:
   before the step of analyzing the collection of information relating to driver skills, attitudes, and behaviors, adding a list of one or more additional skills that would help the participant to improve driving performance to the collection of information relating to the driver skills, attitudes, and behaviors of the participant, wherein the list of one or more additional skills is received from the participant during the conference.

6. A computer-implemented driver training program method according to claim 1, further comprising:
monitoring driving of the participant to obtain actual driving information of the participant; and
before the step of analyzing the collection of information relating to driver skills, attitudes, and behaviors, adding the actual driving information to the collection of information relating to the driver skills, attitudes, and behaviors of the participant.

7. A computer-implemented driver training program method according to claim 6, wherein the step of monitoring comprises using a global positioning system to obtain the actual driving information of the participant.

8. A computer-implemented driver training program method according to claim 6, wherein the step of monitoring comprises using a vehicle computer to obtain the actual driving information of the participant.

9. A computer-implemented driver training program method according to claim 6, wherein the step of monitoring comprises using a vehicle computer equipped with an acceleration/braking sensor to obtain the actual driving information of the participant.

10. A computer-implemented driver training program method according to claim 6, wherein the step of monitoring comprises using a vehicle computer equipped with a cornering force sensor to obtain the actual driving information of the participant.

11. A computer-implemented driver training program method according to claim 6, wherein the step of monitoring comprises using a vehicle computer equipped with a speed sensor to obtain the actual driving information of the participant.

12. A computer-implemented driver training program method according to claim 1, further comprising:
obtaining driving record of the participant; and
before the step of analyzing the collection of information relating to driver skills, attitudes, and behaviors, adding information from the driving record to the collection of information relating to the driver skills, attitudes, and behaviors of the participant.

13. A computer-implemented driver training program method according to claim 1, further comprising:
before the observation drive, examining vehicle used in the observation drive to obtain information regarding safety and mechanical state of the vehicle;
generating a report including the information regarding safety and mechanical state of the vehicle; and
submitting to a vehicle fleet department responsible for maintaining the vehicle the report including the information regarding safety and mechanical state of the vehicle.

14. A computer-implemented driver training program method according to claim 1, further comprising:
generating a report including information regarding at least one of: needs of the participant relating to driver skills, attitudes, and behaviors and suspected problems of the participant relating to driver skills, attitudes, and behaviors; and
submitting the report including the information regarding at least one of needs and suspected problems of the participant to a department capable of acting on the information regarding at least one of needs and suspected problems of the participant.

15. A computer-implemented driver training program method according to claim 1, further comprising:
analyzing the collection of information relating to driver skills, attitudes, and behaviors of the participant to schedule the next observation drive.

16. A computer-implemented driver training program method according to claim 1, further comprising:
delivering at least a portion of the driver training curriculum to the participant over the Internet.

17. A computer system comprising at least one memory storing program code instructions and at least one processor coupled to the at least one memory to execute the program code instructions, wherein the at least one processor under control of the program code instructions is configured to:
obtain, over a network at a time other than an observation drive with a participant, a Dominance/Influence/Steadiness/Compliance (DISC) psychological profile of the participant;
perform a first analysis of information regarding driving skills and behaviors of the participant, wherein the information regarding driving skills and behaviors of the participant comprises the DISC psychological profile and information regarding observations taken by an observer during the observation drive with the participant, wherein the observer conducts the observation drive;
based on the first analysis, prescribe a driver education curriculum for the participant; and
deliver at least a portion of the curriculum to the participant over the network.

18. A computer system according to claim 17, wherein the information regarding driving skills and behaviors of the participant comprises actual driving information of the participant.

19. A computer system according to claim 18, wherein the at least one processor under control of the program code instructions is further configured to:
perform a second analysis of the information regarding driving skills and behaviors of the participant to schedule a next observation drive with the participant.

20. At least one memory storing program code instructions, wherein when the instructions are executed by one or more processors, the one or more processors under control of the program code instructions are configured to:
obtain, over a network at a time other than an observation drive with a participant, a Dominance/Influence/Steadiness/Compliance (DISC) psychological profile of the participant;
perform an analysis of information regarding driving skills and behaviors of the participant, wherein the information regarding driving skills and behaviors of the participant comprises the DISC psychological profile and information regarding observations taken by an observer during the observation drive with the participant, wherein the observer conducts the observation drive;
based on the analysis, prescribe a driver education curriculum for the participant; and
deliver at least a portion of the curriculum to the participant over the network.

* * * * *

UNITED STATES PATENT AND TRADEMARK OFFICE
CERTIFICATE OF CORRECTION

PATENT NO. : 7,695,282 B2
APPLICATION NO. : 11/221027
DATED : April 13, 2010
INVENTOR(S) : Daniel P. Lanktree Page 1 of 1

It is certified that error appears in the above-identified patent and that said Letters Patent is hereby corrected as shown below:

Column 14, line 39, delete "a list a portion" and replace with --at least a portion--.

Signed and Sealed this

Eighth Day of June, 2010

David J. Kappos
*Director of the United States Patent and Trademark Office*